United States Patent Office 2,884,336
Patented Apr. 28, 1959

2,884,336

METHODS FOR PRODUCING COATED LEATHER AND THE PRODUCTS THEREOF

Sam Loshaek, Hatboro, and Walter W. Toy, Philadelphia, Pa., assignors to Rohm & Haas Company, Philadelphia, Pa., a corporation of Delaware No Drawing. Application January 27, 1955
Serial No. 484,564

18 Claims. (Cl. 117—11)

This invention relates to coated leathers and to processes for producing them. It is particularly concerned with coated leathers having composite multi-layer coatings which have improved adhesion to the leather, excellent softness and flexibility even under extremes of cold and heat, good resistance to loss of pigment on rubbing, and improved surface characteristics in respect to dryness of feel, texture and slipperiness.

In conventional practice plasticized nitrocellulose lacquers are customarily applied as coatings for full grain and hand-buffed leathers. When sufficient plasticizer is used in such coatings to provide good flexibility even at low temperatures in the range from $-25°$ C. to $10°$ C., however, the coated leathers are characterized by an undesirable sticky surface, and because of the tendency for plasticizer to become lost gradually, the coating on such leathers gradually increases in brittleness and cracks with age. To some extent the nitrocellulose lacquers have been superseded in the coating of hand-buffed leathers by a coating system involving the application of emulsion polymerized acrylate resins as a base coat followed by the application of vinyl resin lacquers. Such products, while giving a finish of greater flexibility often have even more sticky surface characteristics than those obtained with nitrocellulose lacquers and are characterized even at normal temperatures by a "draggy" surface feel, that is one which does not readily slide over other surfaces (including its own surface) against which the coated leather surface is in contact.

Furthermore, it is frequently necessary or desirable to emboss a coated leather. Generally the embossing is done after the application of the first coat and before the application of a final top coat. While awaiting the embossing operation or after the embossing before the application of the final top coat or top coats, the preliminarily coated leathers carrying a nitrocellulose lacquer or emulsion-polymer coating are generally stacked on one another on a suitable supporting device, such as a table or a "horse" (analogous to the carpenter's saw horse). When leathers carrying such nitrocellulose or emulsion-polymer coatings are thus stacked on one another, fibers on the flesh side of the skin or leather frequently adhere to the tacky coating of the adjacent skin in contact therewith. This mars the coated surface and frequently requires special care in the subsequent application of top coating layers. There is also a tendency to pick up dust from the surrounding atmosphere. Such dust is often difficult to remove, but must be removed completely before the subsequent coatings are applied.

These disadvantages are overcome by the processes of the present invention and novel improved coated leathers are thereby obtained. The present invention provides a preliminary coating on the leather which is of non-tacky character and which allows the preliminarily coated leathers to be stacked on one another without their coated surfaces being marred or otherwise damaged by the impression of, or adherence with, the fibers on the flesh side adjacent contacting leathers in the stack. In addition, the invention provides coated leathers comprising a multilayer coating having improved adhesion to the leather, good softness and flexibility and freedom from draggy or sticky feel on the final exposed surfaces of the coated side of the leather.

Generally, the process of the present invention involves the application to the leather of an aqueous dispersion of polyvalent metal ions and a water-insoluble copolymer of monoethylenically unsaturated monomeric units comprising from about 3 to about 12 mole percent of units containing —COOH groups, drying the dispersion on the leather at a temperature sufficiently high to effect coalescence of the copolymer particles cross-linked by the polyvalent metal into a coating on the leather and subsequently applying a dispersion in an organic solvent comprising a film-forming addition polymer and drying the latter coating. Preferably, but not necessarily, pigmentary material may be included in the aqueous copolymer dispersion to assist in filling imperfections in the leather surface and/or to provide coloring of the coated leather. The last one of the dispersions mentioned preferably contains a pigment suspended therein to provide the ultimate color desired on the finished leather.

The primary or base coating of the aqueous copolymer dispersion cross-linked by the polyvalent metal sets to a non-tacky and non-blocking condition so that leathers carrying such a coating may be stacked or piled on any customary support without risk of damage to the coated surface by the fibers or rough character of the adjacent contacting surfaces of other skins, hides or leathers and without picking up dust from the surrounding atmosphere.

The final top coating system that may be applied to the cross-linked copolymer coating may consist of a single coating comprising a film-forming polymer or it may involve two or more such coatings. In preferred embodiments, a polyisocyanate may be applied to the leather after the application of the aqueous copolymer dispersion. Preferably, two top coatings are applied and the polyisocyanate is incorporated in the first top coating layer which may or may not, but preferably does, contain a pigment. It is followed by a single clear or dulled top coating composition containing no polyisocyanate and comprising the film-forming addition polymer with or without a plasticizer for such addition polymer.

In the discussion which follows, the preparation and application of the aqueous dispersion of polyvalent metal and copolymer containing carboxylic acid units are discussed under the first heading and the various ways of applying subsequent top coatings, and in the preferred embodiments the polyisocyanate, are discussed under the second heading.

I. *Preparation of aqueous coating composition for the primary coat.*—The primary coating composition is an aqueous dispersion that is most advantageously attained by emulsifying with a non-ionic emulsifying and/or dispersing agent and copolymerizing—preferably under the influence of a peroxidic catalyst—a mixture which contains from about 3 mole percent to 12 mole percent of polymerizable monoethylenically unsaturated carboxylic acid group-containing monomers such as acrylic acid, methacrylic acid, itaconic acid, crotonic acid, maleic acid, fumaric acid, the dimer or trimer of methacrylic acid, aconitic acid and citraconic acid. With the acid there is also emulsified at least one other comonomer of monoethylenically unsaturated type, such as one or more of the comonomers mentioned hereinafter. The resulting aqueous dispersion of carboxyl-containing copolymer is then at least partially and preferably completely neutralized by means of certain salts of a polyvalent metal. Less advantageously, water-insoluble copolymers of 3 to 12 mole percent of a carboxylic acid may be dispersed in water by means of non-ionic dispersing agents and then neutralized with a polyvalent metal salt.

The resultant products are to all intents and purposes dispersions of cross-linked resins because pairs of carboxyl groups in the various molecular chains are joined together; i.e., are cross-linked, by the atoms of the polyvalent metals. As long as water is present, ionization occurs and the positive ions of the cross-linked and the negative ions of the resin have a certain degree of mobility so that the cross-linkages are not fixed or rigid. As a result, the resin particles in a film of the dispersion can and do coalesce as drying takes place. However, as the water is removed by evaporation or force-drying, the mobility of the ions is gradually reduced; and when substantially all of the water is removed, the ions become immobilized. Then the metals and the long chains of resin become chemically bound in a rigid, fixed, and cross-linked molecular configuration.

These aqueous dispersions are in reality those of dissociated ionically cross-linked resins and they are decidedly different from the dispersions of resins which are cross-linked by means of a polyvinyl compound such as divinylbenzene. The latter kind of dispersions contain resins which are rigidly cross-linked even when they are dispersed in the aqueous phase and consequently on drying they deposit the resin in the form of discrete particles which do not effectively coalesce and which form weak or discontinuous films.

Furthermore, these aqueous dispersions give rise to films which are not subject to cold-flow and which do not block in contrast to dispersions of the same esters and acids which are not ionically cross-linked. Because of their resistance to blocking, the skins or leathers carrying the cross-linked resin film can be stacked on "horses" before and/or after the embossing operation without the fibers on the flesh side of one skin marring the coated side of the leather in contact therewith.

Useful comonomers which tend to yield soft and flexible polymers when copolymerized with one of the acids mentioned above are those which yield solid polymers which have a $T_i$ below 15° to 20° C. The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The polymerizable, neutral, comonomers which form soft, solid polymers in the presence of peroxidic catalysts include any primary and secondary alkyl acrylate, even with alkyl substituents up to eighteen or more carbon atoms, primary or secondary alkyl methacrylates with alkyl substituents of five to eighteen or more carbon atoms, or other monovinylidene compounds as defined above which are polymerizable below 80° C. with free radical catalysts to form soft solid polymers, including vinyl esters of saturated monocarboxylic acids of over two carbon atoms. The preferred monovinylidene compounds are the stated acrylates and methacrylates and of these the most practical esters are those with alkyl groups of not over 12 carbon atoms.

The preferred monomers which by themselves yield soft polymers may be summarized by the formula $$CH_2=C-COOR^x$$
$$|$$
$$R$$

where R is hydrogen or the methyl group and $R^x$ represents, when R is methyl, a primary or secondary alkyl group of 5 to 18 carbon atoms, or, when R is hydrogen, an alkyl group of not over 18 carbon atoms, or better, of two to 12 carbon atoms.

Typical compounds coming within the above definition are methyl acrylate, ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, n-amyl methacrylate, sec-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylate or methacrylate, etc.

As polymerizable monovinylidene monomers which by themselves form hard polymers, there may be used alkyl methacrylates having alkyl groups of not over four carbon atoms, also tert-amyl methacrylate, tert-butyl or tert-amyl acrylate, cyclohexyl or benzyl acrylate or methacrylate, acrylonitrile, or methacrylonitrile, these constituting a preferred group of the compounds forming hard polymers. Styrene, vinyl chloride, chlorostyrene, vinyl acetate and p-methylstyrene also form hard polymers.

The above monomers yield polymers under the influence of free radical catalysts, particularly peroxidic catalysts, which polymers are generally regarded as hard. These polymers, when free of any appreciable content of monomer, have $T_i$ values above about 20° C. Hard polymers have also been defined as those having softening points above 55° C. or brittle points above about 5° C. These are all different appraisals of the force required to produce a given deformation in a body in a given time and to evaluate the aggregation of various properties encompassed within the term of hardness.

Preferred monomers which by themselves form hard polymers may be summarized by the formula $$CH_2=C-X$$
$$|$$
$$R$$

wherein R is hydrogen or the methyl group and wherein X represents one of the groups —CN, phenyl, methylphenyl, and ester-forming groups, —COOR', wherein R' is cyclohexyl or, when R is hydrogen, a tert-alkyl group of four to five carbon atoms, or, when R is methyl, an alkyl group of one to four carbon atoms. Some typical examples of these have already been named. Other specific compounds are methyl methacrylate, ethyl methacrylate, propyl methacrylate, isopropyl methacrylate, butyl methacrylate, sec-butyl methacrylate, and tert-butyl methacrylate.

It is frequently desirable to copolymerize the carboxyl containing monomer with a mixture of two or more different comonomers, one or more of which are selected from the hard category just mentioned and another of which is selected from the soft category. An example of this would be a copolymer of 8% to 55% ethyl acrylate, 44% to 9% of methyl methacrylate and from about 5% to about 6% of methacrylic or acrylic acids.

For certain purposes, the copolymers of the present invention having a $T_i$ of about 30° C. or lower may be preferred. These set on drying at room temperature. The fact that they dry at room temperature eliminates the necessity to provide a special drying or baking at elevated temperatures to effect the bonding. In addition, their flexibiltiy is outstanding. However, for certain purposes, it is preferred to use dispersions of copolymers having a $T_i$ of 35° C. or higher, such as from 35° to 100° C. In order to effect proper coalescence of such a dispersion, it is necessary that the drying be effected at temperatures above the $T_i$ temperature of the particular copolymer. Otherwise the cross-linked copolymer deposits in particulate form in which the particles are of the order of size of the dispersed resin particles in the aqueous dispersion whereby a continuous film is not obtained. By drying at temperatures above the $T_i$ value, fusion or coalescence occurs.

The dispersions are preferably prepared by emulsifying a mixture of (a) one or more monomeric esters of acrylic and/or methacrylic acid and (b) one or more monomeric unsaturated acids in water and polymerizing the mixture while it is in the emulsified form. A non-ionic emulsifying or dispersing agent should be used. The monomeric esters of acrylic and methacrylic acids which have proven to be most satisfactory are the alkyl esters in which the alkyl group contains one to eight carbon atoms and which are exemplified by the following: methyl, ethyl, n-propyl, isopropyl, n-butyl, isobutyl, sec-butyl, tert-butyl, isoamyl tert-amyl, hexyl, heptyl, n-octyl, and 2-ethylhexyl acrylates and isomers of these. From 3% to 12% on a molar basis of the polymerizable acid is employed.

The non-ionic emulsifiers or dispersing agents that may be used for preparing the monomeric emulsions before copolymerization of dispersions of the polymer after polymerization include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide and nonyl, dodecyl, tetra decyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophilic ethylene oxide sections.

The dispersions can be prepared at temperatures from 0° C. to about 100° C., but intermediate temperatures are much preferred. Thus, with the esters in which the alkyl group contains one to four carbon atoms a temperature from about 10° C. to about 60° C. is employed whereas a higher temperature, e.g., 30° C. to 80° C., is recommended when those esters containing five to eight carbon atoms in the alkyl group are copolymerized. Peroxidic free radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "persalts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites and the salts—such as the sulfates—of metals which are capable of existing in more than one valence state such as cobalt, iron, nickel, and copper. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01% to 1.0%, based on the weight of the monomers, of the peroxidic agent and the same or lower proportions of the reducing agent are recommended. In this way, it is possible to prepare dispersions which contain as little as 1% and as much as 60% of the resinous copolymer on a weight basis. It is, however, more practical—hence preferred—to produce dispersions which contain about 30% to 50% resin-solids.

After polymerization is effected, pigments may be introduced in an amount equivalent to about 10% to 150% by weight of the monomer or polymer weight. Generally, the pigment is first dispersed in water (to a concentration of about 30% to 45%) by means of a non-ionic or anionic dispersing agent or a mixture of both types thereof. Any of the non-ionic dispersing agents mentioned above may be used. As anionic agents, there may be used a higher aliphatic alcohol sulfate, such as the sodium salt of lauryl sulfate or of octadecyl sulfate, an alkylaryl sulfonate, such as the sodium salt of t-octylbenzene sulfonate, a higher alkyl ester of sulfonated dicarboxylic acids, such as the sodium salt of di-octyl sulfosuccinate.

As indicated above, the instant products are dispersions of certain described esters and acids. It is also within the spirit and scope of this invention to substitute for some of the acrylic or methacrylic esters defined above another copolymerizable monoethylenically unsaturated compound such as one which contains a single vinylidene group, $CH_2=C=$. Such compounds include vinyl chloride, vinylidene chloride, styrene, vinyltoluene, vinylnaphthalene, hydroxyalkyl vinyl ethers, such as hydroxyethyl vinyl ether and hydroxypentyl vinyl ether, higher alkyl esters of acrylic and methacrylic acids such as lauryl and octadecyl acrylates and methacrylates, and aryl esters such as benzyl and phenylethyl acrylates and methacrylates. Obviously, such copolymerized materials exert their own influence on the properties of the films which are obtained. Thus, copolymerized styrene makes for greater hardness while octadecyl acrylate makes for softness and flexibility. This invention, therefore, embraces ionically cross-linked copolymers which contain another copolymerized monoethylenically unsaturated compound and especially one having a vinylidene group, $CH_2=C=$, in addition to the acrylic or methacrylic ester and the acrylic, methacrylic or itaconic acid. In such products the amount of copolymerized acid should be 3 to 12 molar percent and the amount of ester should be greater on a molar basis than the amount of the third copolymerized compound.

Free carboxyl groups of the copolymer are partially or totally neutralized. This may be done before or after the incorporation of the pigment and is effected by adding one or more salts of the group consisting of the basic salts of polyvalent metals and their salts of weak acids (which are in effect basic compounds when in the aqueous dispersions), such as the normal and basic acetates of barium, calcium, cadmium, cerium, strontium, zirconium, lead, cobalt (ic and ous), chromium (ic and ous), copper (ic), zinc, magnesium, iron (ous), manganese (ous), mercury (ic), and nickel (ic and ous). Tartrates, citrates, and oxalates may be used, such as stannous tartrate and titanium oxalate. Basic aluminum acetate, basic aluminum formate and basic zirconyl acetate are especially valuable for ionically cross-linking the resins. What is required is that a sufficient number of carboxyl groups be converted into salt groups of the polyvalent cations so that, on removal of the water, the cations link pairs of carboxyl groups together and thus insolubilize the resin. For this purpose, it has been found that the acid groups of the copolymers must be converted to salt groups to such an extent that at least 3% on a molar basis of all of the copolymerized units in the final copolymer are salt groups. Thus, substantially all of the carboxyl groups in a copolymer containing only 3 molar percent of copolymerized acid must be neutralized. In the case of a copolymer which contains a greater proportion of copolymerized acid; i.e., up to 12 molar percent, it is not necessary, although it is desirable, that all of the carboxyl groups be converted to salt groups. But it is always necessary that enough of them be converted to salt groups so as to provide the minimum number mentioned above.

Actually, only two valences of the trivalent metals may be involved in the neutralization so that the compounds of trivalent metals may react, as far as this invention is concerned, as if they were compounds of divalent metals. The number of moles of basic metallic compound which are reacted with the copolymer are from 1.5 to 6 percent of the total number of moles of the ester and acid which are copolymerized when the acid is a monocarboxylic acid and twice that amount when the acid is a dicarboxylic acid, such as itaconic acid. Any insoluble excess of basic salt which is employed over the amount which reacts with the copolymer can be readily separated from the copolymer dispersion by such means as filtration or decantation.

The highly soluble basic salts are rapid in their cross-linking action. They are easily distributed uniformly through the resin dispersions in controlled amounts. They are easy to handle since they can be dissolved in aqueous solutions. They produce coatings of excellent transparency. They do not settle out of the dispersions during storage thereof. In addition, the basic salts are generally three to five times as efficient in cross-linking as the salts of weak acids. Accordingly, the basic salts are the preferred groups of cross-linking compounds.

In order to provide resinous surface-coatings which on the one hand are cross-linked and are consequently water-insoluble and chemical-resistant and which on the other hand are continuous, strongly cohesive, and of high tensile strength, it is essential, first, that the cross-linked copolymer be in the form of a dispersion and, second, that the dispersed copolymer be in the form of dissociated ionically cross-linked salt of a polyvalent cation.

The dispersions of the cross-linked copolymer salt are readily applied to the leather by conventional means such as swabbing, brushing, spraying, dipping, roller-coating, padding and the like. The coatings are then dried either by evaporation or by the application of heat. While heating of the coating is unnecessary, it does accelerate the cross-linking and in general enhances the adhesion of the films. Temperatures up to the boiling point of the aqueous phase of the dispersions can be used; and, since cross-linking takes place during the drying period, there is no particular reason for further heat-treating the dried films.

II. *General coating operations and particularly subsequent coating compositions.*—After the primary coating composition has been coalesced by drying to form a continuous film on the leather, the coated leather may be subjected to a conventional embossing operation such as by passage through embossing rolls or between a pair of flat embossing plates, one of which is reciprocated with respect to the other. One of the rolls or one of the plates is generally provided with raised surfaces to impart the desired pattern on the coated leather. The temperature of embossing may be merely at room temperature but the embossing roll or plate is preferably heated to a temperature of about 75° to 90° C. The temperature and pressure of the embossing surfaces are controlled to avoid damage to the leather or the coating thereon by virtue of excessive heat or excessive pressure, and these two factors depend to a certain extent upon the type of leather and the way it was tanned originally. As pointed out hereinabove, the leathers coated in accordance with the present invention with a cross-linked copolymer of the type described hereinabove can be stacked while awaiting embossing or after being embossed either at normal room temperature or up to about 80° C. without encountering any blocking or marring of the coated surfaces by the fibers on the flesh side of adjacent leathers in the stack. There is little tendency to pick up dust, and whatever dust may deposit is readily removed. Also, during embossing, the coated surface does not stick to the embossing plates. This avoids damage to the finish and saves the time of the operator who would otherwise have to carefully pull the adhered leather and plate apart.

PROCEDURE A (a) After the primary or base coat comprising a cross-linked copolymer, with or without pigment to provide part of the coloring, a subsequent coating is applied which comprises a dispersion in an organic solvent containing a film-forming addition polymer and having, if desired, a pigment dispersed therein. Optionally, depending upon the nature of the addition polymer, this coating composition may also include a plasticizer for the addition polymer; also in preferred embodiments a polyisocyanate is included within such coating composition to enhance the adhesion between the base coat of cross-linked copolymer and the subsequently applied vinyl resin coatings as well as between the leather and the multi-coat finish as a whole. When a polyisocyanate is used, either or both of the film-forming addition polymer and plasticizer may contain groups which are reactive with the polyisocyanate. Such reactive groups include hydroxyl (OH), mercapto (SH), carboxyl (COOH), primary amino ($NH_2$), secondary amino (NHR), tertiary amino as in the pyridyl nitrogen (C=N—C), amide ($CONH_2$), and substituted amide (CONHR), the R in the NHR and CONHR groups being an alkyl or aryl group such as methyl, ethyl, isopropyl, cyclohexyl, or phenyl.

(1) As the film-forming addition polymer there may be used one or more homopolymers or copolymers of the following monoethylenically unsaturated compounds: vinyl chloride, vinyl acetate, vinyl propionate, vinylidene chloride, esters and nitriles of acrylic and methacrylic acids such as acrylonitrile, methacrylonitrile, and the alkyl esters of acrylic or methacrylic acid in which the alkyl group may be methyl, ethyl, propyl, isopropyl, butyl, octyl, dodecyl, hexadecyl and octadecyl. Besides the above homopolymers and copolymers, polyvinyl acetals such as polyvinyl acetal itself, polyvinyl butyral or partially hydrolyzed homopolymers and copolymers of vinyl acetate, vinyl propionate or of acrylic and methacrylic esters may be used. Such compounds contain reactive hydroxyl and carboxyl groups. Other polymers containing reactive groups may be used provided the polymers do not contain sufficient thereof to render them insoluble in the organic solvent employed. Such polymers include the copolymers containing up to 50 mole percent of β-hydroxyethyl vinyl ether or of β-hydroxypentyl vinyl ether, up to 50 mole percent of aminoethyl acrylate, aminoethyl vinyl ether or N-methyl- or N-ethylaminoethyl vinyl ether, or up to 30 mole percent of a vinyl pyridine, such as 2-vinyl pyridine, or 4-vinyl pyridine, or of an amide, such as acrylamide, methacrylamide, N-methyl acrylamide or of an acid, such as acrylic acid, methacrylic acid, itaconic acid, crotonic acid, maleic acid, and the dimer or trimer of methacrylic acid or the like.

(2) Besides the film-forming addition polymer or resin, examples of which are given above, the coating composition contains an organic polyisocyanate and especially the hydrocarbon polyisocyanates including ethylene diisocyanate, trimethylene diisocyanate, tetramethylene diisocyanate, hexamethylene diisocyanate, decamethylene diisocyanate, p-phenylenediisocyanate, m-phenylenediisocyanate, naphthalene diisocyanates, benzene 1:3:5-triisocyanate, toluene-2:4:6-triisocyanate, ethylbenzene-2:4.6-triisocyanate, monochlorobenzene - 2:4:6 - triisocyanate, triphenylmethane-4:4':4"-triisocyanate and diphenyl - 2:4:4' - triisocyanate, toluene-2,4-diisocyanate, 4,4' - diisocyanato - biphenyl, 3,3'-dimethyl-4,4'-diisocyanato-biphenyl, and 3,3'-dimethoxy-4,4'-diisocyanato-biphenyl. The polyisocyanates have various reactivities, some being much slower than others. For example, diphenylmethane-4,4'-diisocyanate is highly reactive whereas the 3,3'-dimethoxy-4,4'-diisocyanato-biphenyl is relatively slow. To compensate for the difference in reactivity, the proportion added may be increased for the slower ones and decreased for the faster ones or basic catalysts, such as tertiary amines may be included, especially with the slower ones. Mixtures of the polyisocyanates may be used of which preferred combinations are mixtures of toluene-2,4-diisocyanate with either 3,3'-dimethyl-4,4'-diisocyanato-biphenyl or 3,3'-dimethoxy-4,4'-diisocyanato-biphenyl.

(3) The plasticizer, when used, may be a polyester, polyamide or polyester amide such as may be obtained by the condensation reaction of a dibasic acid with a polyol or a polyamine. More particularly, the plasticizer (which may be termed a "polymeric" plasticizer) may be obtained by reacting combinations of materials of the general types noted below:

I. Glycols (or other polyols) and dibasic acids
II. Amino alcohols and dibasic acids
III. Glycols, diamines and dibasic acids
IV. Glycols, amino alcohols and dibasic acids
V. Amino alcohols, diamines and dibasic acids
VI. Amino acids, glycols and dibasic acids
VII. Amino acids, amino alcohols and dibasic acids
VIII. Amino alcohols, dibasic acids and hydroxycarboxylic acids It is advantageous to use a small excess of the alcoholic-hydroxyl-containing constituent in preparing the polymers.

Examples of polyols include trimethylol methane and erythritol. Examples of glycols are ethylene glycol, propylene glycol, diethylene glycol, trimethylene glycol, pentamethylene glycol, hexamethylene glycol, decamethylene glycol, dodecamethylene glycol, 1:12-octadecanediol and pentaglycol.

Examples of dibasic carboxylic acids are malonic, succinic, glutaric, adipic, β-methyladipic, pimelic, suberic, azelaic, sebacic, undecanedioic, brassylic, isophthalic, hexahydroterephthalic, p-phenylene-diacetic and acetone-dicarboxylic acid.

Any amino alcohol having at least one hydrogen atom attached to the amino nitrogen atom may be employed including aromatic amino alcohols, e.g. p-hydroxymethylbenzylamine, 4-hydroxymethyl-4-aminomethyldiphenyl and p-aminophenylethyl alcohols; aliphatic amino alcohols, e.g. 5-aminopentanol-1:6-amino-5-methylhexanol-1,4(p-aminophenyl)cyclohexanol, hydroxyethoxyethoxyethylamine, and N-(β-aminoethyl)-N-(omega-hydroxyhexyl)-aniline.

The preferred amino alcohols are of formula

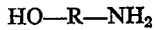

where R represents saturated divalent hydrocarbon radicals with a chain length of at least two carbon atoms. Amino alcohols which fall within this group include ethanolamine, 3-aminopropanol, 4-aminobutanol, 6-aminohexanol, and 10-aminodecanol.

Any diamine may be employed, which contains at least one hydrogen atom attached to each amino nitrogen atom. The preferred diamines are of formula $NH_2RNH_2$ where R represents saturated divalent hydrocarbon radicals with a chain length of at least two carbon atoms, e.g., ethylenediamine, hexamethylenediamine, 3-methylhexamethylenediamine, and decamethylenediamine. However, aromatic diamines such as m-phenylenediamine may also be used.

Any polymerizable monohydroxy monocarboxylic acid or ester-forming derivative thereof may be employed. The preferred hydroxy-acids are of formula

where R represents saturated divalent hydrocarbon radicals, e.g. 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactam, etc.

(4) Any suitable pigment may be employed, depending on the color desired, including red iron oxide, chrome green, molybdate chrome orange, phthalocyanines, such as copper phthalocyanine, titanium dioxide, lithopone, chrome yellow, ultramarine blue, red cadmium, yellow cadmium, organic toners and lakes, and so on.

(5) The organic solvents that may be used include ketones such as acetone, methyl ethyl ketone and dioxane; hydrocarbons such as xylene, toluene, benzene as well as paraffinic or naphthenic types such as solvent naphthas, esters such as ethyl, propyl, butyl and amyl acetate as well as ethoxyethyl acetate, butoxyethyl acetate and the like, or ethers such as butyl ethyl ether. The solvent may comprise a mixture of several types, but in any case the solvent should be of a type which does not contain an active hydrogen.

(6) Besides the above essential ingredients, the composition may contain auxiliary ingredients added for specific purposes for special instances. For example, a lubricant such as paraffin wax or mineral oil may be included in a small amount of about ½% to 1% by weight of the solution to act as a mold release agent if the leather is to be subjected to embossing after the application of any particular coating. Stabilizers for any particular component of the composition may be included. Thus tertiary amines may be employed with certain vinyl chloride polymers to stabilize the composition. In some instances, it may be desirable to incorporate an accelerator or catalyst for hastening the reaction of the polyisocyanate with the leather or with plasticizer or film-forming addition polymer within the coating composition itself. The amount of such an accelerator may be from 1% to 5% by weight of the polyisocyanate used and as such an accelerator tertiary amines are especially valuable such as trialkylamines, dimethylpiperazine, dimethylaminocyclohexane (hexahydrodimethylaniline), perhydroethylcarbazol, methyl- or butylpyrrolidine and its homologues, quinoline and its homologues. The action of the tertiary amines depends upon their basic character. Triethylamine exhibits the strongest action, while quinoline has the least influence on the speed of the reaction. Such a catalyst may be added to the composition just before use unless a polyisocyanate of unusually low reactivity is used in which case the accelerator may be incorporated without excessively diminishing the storage life of the composition in case it is not to be used immediately after such addition.

In the coat thus generally described which is applied over the ionically cross-linked base coat, the various components may be present in the following proportions. From 20 to 100 parts by weight of plasticizer may be present per 100 parts of the addition polymer; from 5 to 100 parts by weight of a pigment or mixture of pigments per 100 parts of the addition polymer may be present; from 1% to 65% by weight of a polyisocyanate based on the sum of the weights of the plasticizer and addition polymer may be present. The amount of solvent employed may be such as to provide a solids concentration (that is materials other than the solvents themselves) of 2% to 20% by weight.

(7) The coating composition may be applied to the leather in any suitable manner by any known coating equipment such as by brush, roller coating or spraying. The coating is dried such as at normal room temperature or at somewhat elevated temperatures of 40° to 100° C. for a period of time the length of which is inversely proportional to the degree of temperature. For example, a period of ten seconds may be adequate at 100° C. whereas a period of an hour or more may be desirable at 40° C. Preferably temperatures in the lower part of the range specified are employed such as at around 50° C., but in any event the time and temperature of drying are so correlated as to avoid completely reacting the polyisocyanate in the composition.

(b) There is then applied a final coat by means of an unpigmented solution (either clear or dulled by an inert delustering filler) of the plasticizer and film-forming resin, either or both of which may be the same as or different from the plasticizer and film-forming resin of the second coat. In this coating, any of the plasticizers and addition polymers mentioned under (a)3 and (a)1 hereinabove may be used. When the second and the final coating both contain plasticizer, the proportion of plasticizer in this final coating composition is somewhat less in proportion to the addition polymer than the proportion used in the second coating. Generally, it is within the proportion of 15 to 80 parts per 100 parts of the addition polymer. Similarly, the solvents may be the same or different and the solids concentration in the solution applied may be the same as that used for the second coating which may be termed a color coat or it may be widely different therefrom.

After the final coat is applied, drying is effected and it may be carried out under any of the conditions mentioned hereinabove for the drying of the second coat either in the same specific manner in any particular case or under different conditions if desired.

(c) When a polyisocyanate is used, it is preferably included in the first of the organic solvent dispersions and the final coat should be applied before the polyisocyanate applied in the first of such organic solvent dispersions has been completely reacted. It appears that when the first of such organic solvent dispersions is dried to form a coating on the leather under the conditions mentioned above, the polyisocyanate still retains a portion of its reactivity even for a period as long as several days to a week after the drying of the first coat. However, to assure that this residual reactivity is not lost before the second coat is applied, it is preferred that the second coat be applied within 24 hours of the application of the first coat, especially when the coating operation is performed during hot weather or the preliminarily coated leather is stored or must be stored under conditions of high humidity and temperature. The application of the top coat under these conditions apparently results in the polyisocyanate having a pronounced effect upon the top coat and especially its surface characteristics. While it is not desired to be limited to any particular theory, it is believed that the production of the dry, slick, non-draggy feel on the surface of the coated leather products of the present invention is caused by some reaction of the polyisocyanate introduced by way of the second coat with either the plasticizer or film-former or both applied in the top coat. The multi-layer coating produced in accordance with the invention has excellent adhesion to the leather and this is believed to be the result of some reaction between the leather, the polyisocyanate, and possibly either the plasticizer or film-former in the second coating composition or both of such materials therein. The coating retains softness and flexibility and resists cracking over prolonged periods of ageing. This retention of flexibility in conjunction with the production of a dry, slippery feel in the surface is an unexpected and surprising result in view of the absence of a polyisocyanate from the final coating composition. The adhesion obtained between the multi-layer coating of the present invention and the leather is adequate to permit wet molding (that is, forming or shaping while in water-soaked condition) of the leather when it is to be used as case leather. Of course this high degree of adhesion is also advantageous in any other types of leather, such as upholstery leather, garment leather, and glove leather.

PROCEDURE B (a) An alternative procedure may be employed whether there is or is not a pigment included in the cross-linked copolymer base coat. In this modification the advantages sought are to provide separate compositions adapted to be stored for long periods of time such as several weeks before use. The introduction of a polyisocyanate into a coating composition as described in Procedure A above reduces the stability of such composition, especially when it contains pigments. It appears that even though the polyisocyanate may be quite slow in reacting with the plasticizer or film-forming component of the composition so that such composition would remain as a fairly stable solution without signs of gelling for several weeks, when such a polyisocyanate is added to a composition of the same type but containing a pigment, the pigment settles out in a short period of time in many cases, such as within a short a period as an hour in the most difficult cases and frequently in less than 24 hours. To overcome this disadvantage, the present modification provides two or three master solutions or dispersions or component solutions or dispersions adapted to complement each other so that when mixed, just before use, they provide the appropriate proportions of the several ingredients including the film-forming addition polymer, the plasticizer, the polyisocyanate, pigment and solvents. One component solution may contain none, part, or all of the plasticizer and all of the polyisocyanate dissolved in the selected solvent or solvent mixture. For example, this component solution may contain from $\frac{1}{3}$ to $\frac{1}{2}$ of the amount of plasticizer finally desired in the coating composition and all of the polyisocyanate in approximately the smallest amount of solvent needed to dissolve these two materials although additional solvent may be employed if desired. When this component solution contains part of the plasticizer, it has been found that the lower the proportion of plasticizer to the polyisocyanate the more stable this component solution becomes. It appears that the polyisocyanate reacts with the available reactive groups in the plasticizer in such a manner as to produce, when the polyisocyanate is present in excess, a condensate having the isocyanate groups predominating among the reactive groups, thereby imparting reasonable stability to the solution. A second component dispersion may then be made up containing all of the film-forming resin, the remainder of the plasticizer if any, and the pigment, in the remaining portion of solvent needed. These two component dispersions may be stored for considerable periods of time and yet are easily mixed just before they are needed for use.

A modification of this system may involve the combination of three or more component dispersions to produce the coating composition ultimately desired for application. In such a modification, one component may be the same as the first one mentioned above containing at least a portion of the plasticizer and all of the polyisocyanate. A second component dispersion may comprise a suspension of the pigment in a solution of a portion of the film-forming resin and either the remainder of the plasticizer or an additional portion thereof in a part of the solvent. These two component dispersions may then be used in conjunction with a third solution in the solvent, of a film-forming resin without additional plasticizer or with a predetermined portion thereof. As pointed out, the several component dispersions are reasonably stable and can be stored within the limits of their stability before use. At the same time, they are readily mixed at the time of use.

The coat obtained by the application of a mixture of the two or more separate component dispersions is dried in the same manner as specified above in Procedure A, part (a)7, and the same final clear or dulled coat is applied as is described in Procedure A, part (b) before the polyisocyanate in the first coat is completely reacted and then the final coat is dried as described in Procedure A, part (a)7.

An unexpected advantage of this system is an improved adhesion as compared to that which may be obtained by Procedure A hereinabove using a given proportion of polyisocyarate relative to the amounts of film-forming resin and plasticizer. Generally, it has been found that improved adhesion is obtained when the polyisocyanate is preliminarily reacted with the plasticizer before it is introduced into the coating composition containing the film-forming resin. The properties of the coated leather obtained by this procedure are essentially the same as those obtained by Procedure A except for the better adhesion just pointed out.

When the polyisocyanate is to be pre-reacted with either the plasticizer or the film-forming resin (when a reactive type of such resin is used) in order to get improved adhesion or in some cases as pointed out above to obtain better stability in the coating solutions or compositions, the reaction may be effected under a variety of conditions. For example, the plasticizer or the reactive resin may be fused or it may be dissolved in a solvent which is to form a part of the final composition. Then the polyisocyanate is introduced and may be allowed to react at room temperature, preferably with stirring and under a nitrogen atmosphere. Such reaction at room temperature may be allowed to proceed for 24 to 48 hours and if a relatively slow-reacting polyisocyanate is used, a base catalyst such as a teritary amine may be introduced to accelerate it. If desired, elevated temperatures may be employed up to 120° to 130° C., or even as high as 190° C. or more provided the temperature is below the decomposition temperature of the particular plasticizer or resin and not above the boiling point of any solvent used. At the higher temperatures the time of reaction may be as short as ten minutes. Instead of dissolving the plasticizer in a solvent and then introducing the polyisocyanate, the polyisocyanate may be dissolved in the solvent and the plasticizer or reactive resin or a mixture thereof may be introduced, preferably gradually into the polyisocyanate solution (so that excess polyisocyanate is present throughout most or all of the reaction period) either in the presence or absence of a base catalyst, such as a tertiary amine, again preferably with stirring and under an inert atmosphere such as nitrogen. In all cases, it is preferred to avoid temperatures above 60° C. to reduce the possibility of dimerization and polymerization of the polyisocyanates to high molecular weight polyurethanes and also to reduce the risk of cross-linking by the polyisocyanates during the preliminary reaction which may occur between any reactive hydrogen on the groups produced by the initial reaction of the isocyanate group with the reactive groups of the plasticizer or resin, such as the reactive hydrogen on the urethane groups produced from hydroxyl groups. This cross-linking reaction is favored by high temperatures and base catalyst. Such preliminary reaction may be effected with polymers which normally are not considered to contain hydroxyl groups. Such polymers include the homopolymers and copolymers of such esters as vinyl acetate, vinyl propionate and methyl acrylate. For example, copolymers containing 80% to 90% of vinyl chloride and 5% to 20% of vinyl acetate are normally thought of as being free of hydroxyl groups. Apparently, however, such copolymers may, and generally do, contain a small amount of hydroxyl, such as twenty hydroxyl groups, in a copolymer containing 87% vinyl chloride and having a number average molecular weight of 40,000 to 50,000. Such polymers are, therefore, adapted to be prereacted with the polyisocyanate as described above.

PROCEDURE C

Another top-coating modification that may be applied over the ionically cross-linked copolymer base coat involves the provision of two or more separate component dispersions which are brought together in a spraying system, such as by the provision of two or more separate feed pipes connected with suitable containers for the component dispersions in place of a single liquid feed pipe normally used in a spray gun or other spray systems. In an example of this system, one such component solution preferably comprises all of the polyisocyanate with a portion, such as one-half of the entire amount, of film-forming resin and at least a portion of the plasticizer, and about one-half the solvent. In this component solution, the plasticizer or film-forming polymer (if it contains reactive groups) or both may be pre-reacted with the polyisocyanate before they are introduced. Alternatively, the plasticizer and/or the film-forming resin may be reacted with a monoisocyanate. As a third alternative one of the plasticizer and addition polymer may be reacted with the polyisocyanate and the other may be reacted with a monoisocyanate. Such a monoisocyanate may be phenyl isocyanate, a toluene monoisocyanate, ethyl isocyanate, hexyl isocyanate, and naphthyl isocyanate or the like. This reaction with a monoisocyanate may be effected in the following manner: The plasticizer or reactive resin is dissolved in a solvent, such as any of the organic solvents mentioned above, which solvent is to be part of the final composition. Then the monoisocyanate is added while stirring the batch under a nitrogen atmosphere. The temperature may vary from room temperature, at which it may be allowed to proceed for 24 to 48 hours or it may be at elevated temperatures such as up to 40° to 60° C. At 40° C. the reaction may be allowed to proceed anywhere from three or four hours to fifteen or twenty hours. The proportion of monoisocyanate is preferably that equivalent to the reactive groups in the plasticizer or in the polymer. However, somewhat less or a considerable excess may be used but it is preferred not to use an excess.

The other component dispersion, when two are used as is the preferred situation, contains the remainder of solvent and about one-half of the film-forming resin dissolved therein and sufficient pigment suspended therein to provide the ultimate concentration of color. The two component solutions are preferably made up with such proportions of the solvent and other components that the mixture of equal parts by volume of the two dispersions will provide the concentrations desired of the various components in the final coating. However, the supply pipes in the double spray or multi-spray system may be provided with flow control devices, such as valves, to assure that the proper volume (whether equal or not) of each component solution or dispersion is mixed at the point of spraying. The use of such control devices is necessary when the component dispersions comprise, on the one hand, a simple solution of the polyisocyanate in a part of a solvent and, on the other hand, a suspension of the pigment in a solution of the plasticizer and film-forming resin in the remainder of the solvent. In such a two component system, it is generally desirable that the polyisocyanate solution be fed at a much lower rate to the point of spray-formation in the nozzle than the color suspension.

As in Procedures A and B hereinabove, the sprayed coat obtained from such a multi-component spray system is dried as before and a final clear or dulled top coat of the type described in part (b) of Procedure A is applied, and the system is again dried. As in the preceding procedures, the top coat is applied before the polyisocyanate has undergone complete reaction. The quality of the coated product is similar to the products of Procedures A and B and has the aforesaid improved adhesion when the polyisocyanate is pre-reacted with the plasticizer or with the film-forming polymer before it is introduced into its respective component solution.

PROCEDURE D

In those unusual cases where practically all or most of the pigment needed for coloration is included in the primary coating comprising the cross-linked copolymer, a single subsequent coat derived from an organic solvent solution or dispersion may be all that is needed. Such a coating comprises a film-forming addition polymer of the type mentioned before, optionally a plasticizer for the polymer, in the preferred cases a polyisocyanate and, if desired, a small proportion of supplemental pigment. This single coating composition may be essentially the same as the first organic solvent dispersion applied in Procedures A, B, and C above, or it may be the same except for the reduction of the amount of pigment or the complete elimination thereof.

In most cases, however, it is preferable to apply two coats over the base coat even when it is pigmented. The second coat would be pigmented and the last coat would be a clear or dulled lacquer. The procedure for applying the last two coats may be any of Procedures A, B, and C hereinabove.

PROCEDURE E

If desired, a solution of a polyisocyanate may be applied to the cross-linked base coat on the leather by spraying or swabbing before the application of the top-coating system. Subsequent coating procedures may follow Procedures A, B, C, and D hereinabove except that the polyisocyanate is not necessary in the subsequent coatings, but may be included.

In the following examples the parts are by weight unless otherwise noted:

*Example 1*

(a) The following components were placed in a pint jar:

71.25 parts ethyl acrylate
3.75 parts acrylic acid
217 parts water
6.43 parts non-ionic dispersing agent (a 70% aqueous solution of a tert-octyl-phenoxypolyethoxyethanol containing an average of about 35 oxyethylene units in the molecule)

The jar was capped and shaken till emulsification occurred. Then the mixture was cooled to 20° C. and there was added 0.09 part of ammonium persulfate, 0.15 part of t-butyl hydroperoxide, and 0.12 part of sodium hydrosulfite. The mixture was stirred occasionally and the exothermic polymerization soon began, as evidenced by a rapid rise in temperature which in a few minutes reached about 60° C. at which point an ice-bath was applied. The mixture was thereby cooled to 38° C. at which point the ice-bath was removed and to the mixture was added 0.78 part of t-butyl hydroperoxide dissolved in 6 parts of water. The resultant mixture was further stirred for 30 minutes. The resulting copolymer had a $T_1$ of —10° C.

(b) To the resulting copolymer dispersion 4.25 parts of basic aluminum acetate, dissolved in 12.75 parts water, is added. The mixture after 24 hours is filtered. Then 50 parts of red iron oxide pigment dispersed in 90 parts of water was added and mixed in. A hand-buffed leather is coated with the resulting dispersion, dried at 50° C. and then embossed in an embossing press at 75° C. The surface of the coated leather was non-tacky and resisted blocking even at 80° C. The coated surface was not marred by the fibers of adjacent leathers stacked thereon.

(c) A mixture of 40 parts of red iron oxide, six parts of a plasticizer consisting of a polyester obtained by the reaction of sebacic acid with an excess of propylene glycol and having a number average molecular weight of about 4,000, 2.9 parts by weight of a copolymer of 90% vinyl chloride and 10% vinyl acetate having a number average molecular weight of about 40,000, 6.1 parts ethoxyethyl acetate, 25 parts of methyl ethyl ketone and 20 parts of a petroleum solvent consisting of a mixture of aromatic, naphthenic, and aliphatic hydrocarbons is ground in a ball mill for 24 hours to form a pigment dispersion.

(d) A solution is also formed from 3.1 parts of the same plasticizer as above, 5.0 parts of the same vinyl copolymer, and 3.0 parts of toluene-2,4-diisocyanate in 10 parts of ethoxyethyl acetate, 44 parts of methyl ethyl ketone and 34.9 parts of a hydrocarbon solvent largely consisting of xylol.

(e) The solution of part (d) hereof is then mixed with the milled pigment dispersion of part (c) hereof in the ratio of 90 parts of the former to 10 parts of the latter. The resulting dispersion is applied to the coated leather obtained in part (b) hereof and dried at 50° C. for about three hours.

(f) Then a clear coating is applied by spraying a solution containing about 1.5% of the same plasticizer and 5% of the same vinyl copolymer in a solvent mixture composed of 10% of ethoxyethyl acetate, 55% methyl ethyl ketone and 35% of a hydrocarbon composed largely of xylene. After applying the clear coating by spraying, it was dried at 50° C. The final coated leather had a glossy color, was soft and flexible but free of any draggy feel.

(g) The procedure of parts (a) to (f) inclusive is repeated, replacing the toluene-diisocyanate with six parts of 3,3'-dimethoxy-4,4'-diisocyanato-biphenyl. The coated leather was similar in character.

*Example 2*

(a) Using the method for Example 1(a) but with twice as many catalysts, and substitution of appropriate monomers, an aqueous dispersion containing about 25% of a copolymer of about 53% of ethyl acrylate, about 41% of methyl methacrylate and about 6% of acrylic acid was produced.

(b) To 300 parts of the dispersion produced in part (a) hereof, 20.3 parts of a 25% solution of basic aluminum acetate in water is added to neutralize the carboxylic acid groups. The resulting dispersion of a copolymer (having a $T_1$ of about 36° C.) and aluminum ions is filtered and 75 parts of molybdate chrome orange dispersed in about 115 parts of water is added and mixed in. The resulting dispersion is applied by spraying to a hand-buffed leather and dried at 50° C. The coated leather was subsequently embossed by means of platens at about 80° C. and then stacked under others. The coated surface was not marred in any way by the fibers of the adjacent leather in the stack.

(c) The pigment dispersion was made as in Example 1(c) except that the vinyl copolymer was raised to 3.5 parts by weight and the iron oxide was replaced with 40 parts of molybdate chrome orange. After ball milling this dispersion, it was mixed with the solution of Example 1(d) in the proportion of 10 parts by weight of the pigment dispersion to 90 parts by weight of the solution. The resulting dispersion was applied to the coated leather obtained in part (b) hereof and dried at 50° C. for about three hours. Then a clear coating was applied as in Example 1(f). The coated leather was similar to the products of Example 1 except for the tangerine color and somewhat greater stiffness.

*Example 3*

(a) An aqueous dispersion of a copolymer containing about 25% of 55% methyl methacrylate, 40% of ethyl acrylate and 5% of methacrylic acid having a $T_1$ of 58° C. is produced as in Example 2(a) above.

(b) Then 2.93 parts of basic aluminum formate in 8.8 parts of water was added to 300 parts of the dispersion obtained in part (a) hereof to substantially neutralize the carboxylic groups thereof. The mixture after standing for 24 hours was filtered. A hand-buffed leather was coated with the resulting aqueous dispersion by spraying. The leather while its coating was still wet was then dried at a temperature of 65° C. It was embossed by embossing rolls at a temperature of 90° C. and then was stacked while still hot under other leathers.

No evidence of any tackiness or blocking action or marring was found in the stacked leather.

(c) The coated leather was then finished by the procedure of Example 1(c) through (f) except that the iron oxide in part (c) thereof was completely replaced with 6.5 parts of copper phthalocyanine, the mixed solvent being correspondingly increased to bring the total composition to 100 parts. The coated leather product was similar to those of Example 2 except that it had a blue color and was somewhat stiffer.

(d) The procedure of parts (a) through (c) hereof is repeated, replacing the toluene-diisocyanate with 3,3'-dimethyl-4,4'-diisocyanato-biphenyl.

Example 4

(a) An aqueous dispersion containing about 26% of a copolymer of 35% acrylonitrile, 60% ethyl acrylate and 5% itaconic acid having a $T_i$ between 36° and 40° C. was produced by the procedure of Example 2(a).

(b) The dispersion obtained in part (a) hereof was filtered and then about 5% of the basic zirconyl acetate based on the polymer weight is added to neutralize carboxyl groups in the copolymer. Titanium dioxide in amount equal to the amount of copolymer dispersed in a small amount of water with a dispersing agent was mixed into the dispersion. The resulting dispersion was swabbed on a hand-buffed leather and dried at 50° C. After drying, the coated leather was stacked within a pile of other leathers, then passed through an embossing operation wherein the embossing plate had a temperature of about 75° C. and finally stacked while still hot. The coated surface of the leather showed no evidence of any damage caused by a fiber surface of an adjacent skin being in contact therewith within the stack.

(c) The embossed leather was then top-coated by the procedure of Example 1(c) through (f) hereinabove.

(d) The procedure of parts (a) through (c) hereof was repeated, replacing the toluene-diisocyanate with a mixture of two parts of toluene-2,4-diisocyanate and four parts of 3,3'-dimethyl-4,4'-diisocyanato-biphenyl.

Example 5

(a) An aqueous dispersion of 96% of ethyl acrylate with 4% of methacrylic acid dimer was produced by the procedure of Example 1(a). The copolymer obtained had a $T_i$ of about −6° C.

(b) The carboxyl groups in 300 parts of the resulting copolymer dispersion were neutralized by the addition of 2.76 parts of calcium acetate. A hand-buffed leather was coated with the resulting dispersion and after drying at 60° C. the leather was embossed at about 70° C. After embossing, the leather was stacked under others for a period of 24 hours before proceeding to the coating operations of part (c) hereof. When removed from the stack, it showed no evidence of any damage to the coated surface as a result of blocking or tackiness thereof.

(c) The embossed leather obtained from part (b) hereof was then coated as in Example 1(c) through (f).

Example 6

(a) An aqueous dispersion of a copolymer of 67% butyl acrylate, 30% methyl methacrylate and 3% fumaric acid having a $T_i$ of about −10° C. was produced by the procedure of Example 2(a).

(b) To 300 parts of this dispersion 12.6 parts of a 25% solution of basic aluminum acetate is added to neutralize the carboxylic acid groups. After 24 hours standing at room conditions, the dispersion was filtered. Then 50 parts of red iron oxide pigment dispersed in 90 parts of water was added and mixed in. A hand-buffed leather is coated with the resulting dispersion, dried at 50° C. and then embossed in an embossing press at 75° C. The surface of the coated leather was non-tacky and resisted blocking even at 80° C. The coated surface was not marred by the fibers of adjacent leathers stacked thereon.

(c) Then, over the previously coated surface of the embossed leather, a single clear coating of the composition of that in Example 1(f) was applied and dried as in Example 1(f).

Example 7

(a) An aqueous dispersion containing about 27% of a copolymer of 10% styrene, 85% ethyl acrylate and 5% crotonic acid having a $T_i$ about 15° C. was produced by the procedure of Example 2(a).

(b) To 300 parts of the dispersion of part (a) hereof, 14.1 parts of a 25% solution of basic aluminum acetate in water was added for neutralization of the carboxylic acid groups. Then 50 parts of red iron oxide pigment dispersed in 90 parts of water was added and mixed in. A hand-buffed leather is coated with the resulting dispersion, dried at 50° C. and then embossed in an embossing press at 75° C. The surface of the coated leather was non-tacky and resisted blocking even at 80° C. The coated surface was not marred by the fibers of adjacent leathers stacked thereon.

(c) Place a mixture of 15 parts of toluene-2,4-diisocyanate and 15 parts of methyl ethyl ketone into a pot and heat to 60° C. While stirring this hot mixture, add slowly a solution of 15.5 parts of the plasticizer described in Example 1(c) and 15.5 parts of methyl ethyl ketone. After all the latter solution has been added, maintain the pot at 60° C. with continued stirring for 15 to 20 hours. This mixture is allowed to cool and 39 parts of methyl ethyl ketone is added. The above amount of toluene-2,4-diisocyanate amounts to about a 13-fold excess of isocyanate groups over reactive groups in the plasticizer.

(d) Twenty parts of the solution of part (c) hereof are added to 70 parts of a solution containing 7 parts of the vinyl copolymer described in Example 1(c) above, 35 parts of methyl ethyl ketone, 45 parts of xylene and 13 parts of ethoxyethyl acetate. This mixture is mixed with 10 parts of the pigment suspension produced in Example 1(c). The resulting dispersion is applied to the coated leather obtained in part (b) hereof and is dried at 50° C. for about three hours.

(e) Then, the clear coating of Example 1(f) was applied and dried as in that example. The finished leather had a glossy appearance, was soft and flexible and free of any draggy feel.

(f) The procedure of parts (a) through (c) hereof is repeated except the plasticizer was replaced with a corresponding amount of a polyamide obtained from the reaction of an excess of trimethylenediamine with succinic acid until a number average molecular weight of 3000 was obtained. The finished leather was similar to that obtained in part (e) hereof.

(g) The procedure of parts (a) through (e) hereof is repeated replacing the copolymer there used with corresponding amounts of a copolymer of 60% of styrene and 40% of butyl acrylate having a number average molecular weight of about 250,000. A finished leather having good flexibility and a non-tacky surface is obtained.

Example 8

(a) An aqueous dispersion containing about 25% of a copolymer of 85% ethyl acrylate, 10% methyl methacrylate and 5% maleic anhydride having a $T_i$ of about −2° C. was produced by the procedure of Example 2(a). After filtration, 2.39 parts of $Ca(OH)_2$ suspended in 20 parts of water was added to 300 parts of the dispersion. A buffed leather is coated with the resulting dispersion, dried at 50° C. and then embossed in an embossing press at 75° C. The surface of the coated leather was non-tacky and resisted blocking even at 80° C. The coated surface did not collect dust and was not marred by the fibers of adjacent leathers stacked thereon.

(b) Twenty parts of the solution obtained in Example 4(c) are added to 70 parts of a solution containing 7 parts of the vinyl copolymer described in Example 1(c) in 35 parts of methyl ethyl ketone, 45 parts of xylene, and 13 parts of ethoxyethyl acetate and the mixture is placed in a pressure container of a spray gun system. In a similar but separate container, 90 parts of the solution of Example 1(d) is mixed with 20 parts of the pigment suspension of Example 1(c). Hose leads from these two containers are brought by means of a Y-connection to a common discharge pipe of a conventional spray gun. The flow from each container is adjusted by means of valves in each line preceding the Y-connection so that about the same weight of material is sprayed from each container. The leather is then treated with the clear solution of Example 1(f) and dried at 50° C.

*Example 9*

(a) An aqueous dispersion containing about 27% of a copolymer of 80% butyl acrylate, 17% acrylonitrile and 3% aconitic acid having a $T_i$ of about −5° C. was produced by the procedure of Example 2(a). This dispersion (300 parts) was neutralized by the addition of 3.32 parts of $Ba(OH)_2$ suspended in 20 parts of water. After standing at room condition for 24 hours, it was filtered. Then 50 parts of red iron oxide pigment dispersed in 90 parts of water was added and mixed in. A hand-buffed leather is coated with the resulting dispersion, dried at 50° C. and then embossed in an embossing press at 75° C. The surface of the coated leather was non-tacky and resisted blocking even at 80° C. The coated surface was not marred by the fibers of adjacent leathers stacked thereon.

(b) A solution consisting of 10 parts of toluene-2,4-diisocyanate and 90 parts of methyl ethyl ketone is swabbed on the coated face of the leather obtained in part (a) hereof. The leather is allowed to air dry for 30 minutes. It is then treated in the same manner and with the same materials as described in Example 1(c) to (f) inclusive except that the toluene-2,4-diisocyanate is omitted from the solution in part (a) thereof and is replaced with 3 parts of methyl ethyl ketone. The results are similar to those obtained in Example 1, except the surface was slightly less slippery than those of the finished leather obtained in Example 1.

It is to be understood that changes and variations may be made without departing from the spirit and scope of the invention as defined in the appended claims.

We claim:

1. A process for producing a coated leather comprising applying to the surface of a leather an aqueous dispersion of polyvalent metal ions, a non-ionic dispersing agent and from 1% to 60% by weight of a water-insoluble copolymer of monoethylenically unsaturated monomeric units comprising 3 to 12 mole percent of units containing —COOH groups, the polyvalent metal ions being sufficient to neutralize in the copolymer on drying at least 3 mole percent of units containing —COOH, drying the dispersion on the leather at a temperature sufficiently high to effect coalescence of the copolymer particles cross-linked by the polyvalent metal into a coating on the leather, subsequently applying a dispersion in an organic solvent comprising a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, and a polyisocyanate, the concentration of the organic solvent dispersion being from 2% to 20% and the amount of polyisocyanate being from 1% to 65% by weight of the addition polymer, and drying the latter coating, at least one of said dispersions containing a pigment suspended therein, the proportion of pigment when in the aqueous dispersion being from about 10% to 150% by weight of the copolymer and when in the organic solvent dispersion being from 5% to 100% by weight of the addition polymer therein.

2. A process as defined in claim 1 in which the polyisocyanate is toluene-2,4-diisocyanate.

3. A process as defined in claim 1 in which the polyvalent metal is aluminum.

4. A process as defined in claim 1 in which the polyvalent metal is calcium.

5. A process as defined in claim 1 in which the polyvalent metal is zirconium.

6. A process for producing a coated leather comprising applying to the surface of a leather an aqueous dispersion of polyvalent metal ions, a non-ionic dispersing agent, and from 1% to 60% by weight of a water-insoluble copolymer of 3 to 12 mole percent of units containing —COOH groups with at least one other comonomer selected from the group consisting of esters of an acid selected from acrylic and methacrylic acid, the polyvalent metal ions being sufficient to neutralize in the copolymer on drying at least 3 mole percent of units containing —COOH, drying the dispersion on the leather at a temperature sufficiently high to effect coalescence of the copolymer particles cross-linked by the polyvalent metal into a coating on the leather, embossing the coated leather, subsequently applying a dispersion in an organic solvent comprising a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, and a polyisocyanate, the concentration of the organic solvent dispersion being from 2% to 20% and the amount of polyisocyanate being from 1% to 65% by weight of the addition polymer, and drying the latter coating, at least one of said dispersions containing a pigment suspended therein, the proportion of pigment when in the aqueous dispersion being from about 10% to 150% by weight of the copolymer and when in the organic solvent dispersion being from 5% to 100% by weight of the addition polymer therein.

7. A process as defined in claim 6 in which the acid is acrylic acid and the polyvalent metal ions are obtained by the introduction of basic aluminum acetate and the organic solvent dispersion contains a copolymer of vinyl chloride with vinyl acetate as at least part of the film-forming addition polymer and also comprises 20% to 100% by weight, based on the weight of the addition polymer, of a polymeric plasticizer for the polymer selected from the group consisting of polyesters, polyamides, and polyester-polyamides.

8. A process as defined in claim 6 in which the polyisocyanate comprises toluene-2,4-diisocyanate.

9. A process as defined in claim 6 in which the polyisocyanate comprises 3,3'-dimethyl-4,4'-diisocyanato-biphenyl.

10. A process as defined in claim 6 in which the polyisocyanate comprises 3,3'-dimethoxy-4,4'-diisocyanato-biphenyl.

11. A process as defined in claim 6 in which the polyisocyanate comprises a mixture of 3,3'-dimethoxy-4,4'-diisocyanato-biphenyl and toluene-2,4-diisocyanate.

12. A coated leather having good softness and flexibility, good adhesion between the coating and the leather, and a substantially dry and slick surface, said coated leather comprising a leather base having a composite multi-layer coating thereon comprising disposed directly on one of the surfaces of the leather, a base coat formed of a water-insoluble copolymer of monoethylenically unsaturated monomeric units comprising 3 to 12 mole percent of —COOH groups cross-linked by a polyvalent metal and, superposed on the first mentioned coating, another coating comprising a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, at least one of said coatings containing a pigment, the proportion of pigment when in the base coat being from about 10% to 150% by weight of the copolymer and when in the organic solvent dispersion being from 5% to 100% by weight of the addition polymer therein, said composite coating containing therein a reaction product of 1% to 65% by weight, based on the weight of the addition polymer, of an organic polyisocyanate with the leather base and with at least one of the aforesaid polymers.

13. A coated leather as defined in claim 12 in which the polyvalent metal is aluminum.

14. A coated leather having good softness and flexibility, good adhesion between the coating and the leather, and a substantially dry and slick surface, said coated leather comprising a leather base having a composite multi-layer coating thereon comprising disposed directly on one of the surfaces of the leather, a base coat formed of a water-insoluble copolymer of monoethylenically unsaturated monomeric units comprising 3 to 12 mole percent of —COOH groups cross-linked by a polyvalent metal and, superposed on the first mentioned coating, an intermediate coat formed of a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, a polyisocyanate in an amount from 1% to 65% by weight of the addition polymer, and from 5 to 100 parts by weight of pigmentary material per 100 parts of the addition polymer, and a topcoat formed of a film-forming addition polymer formed exclusively of at least one monomer selected from the group consisting of vinyl chloride, vinyl acetate, vinyl propionate, vinylidene chloride, acrylonitrile, methacrylonitrile, and alkyl esters of an acid selected from the group consisting of acrylic and methacrylic acids, and a polymeric plasticizer for the polymer selected from the group consisting of polyesters, polyamides, and polyester-polyamides, at least one of the polymer and plasticizer in the composition being reactive toward isocyanate groups, the proportion of plasticizer being from 15 to 80 parts per 100 parts of the addition polymer in said composition, said composite coating containing therein a reaction product of an organic polyisocyanate with the leather base and with at least one of the aforesaid polymers and plasticizer.

15. A coated leather as defined in claim 14 in which the first-named coating contains a pigment in an amount of 10% to 150% by weight of the copolymer.

16. A coated leather as defined in claim 14 in which the acid is acrylic acid, the polyvalent metal is aluminum, and the addition polymer is a copolymer of vinyl chloride and vinyl acetate.

17. A coated leather as defined in claim 16 in which the polyisocyanate comprises toluene-2,4-diisocyanate.

18. A coated leather as defined in claim 16 in which the polyisocyanate comprises a mixture of 3,3'-dimethoxy-4,4'-diisocyanato-biphenyl and toluene-2,4-diisocyanate.

References Cited in the file of this patent

UNITED STATES PATENTS

| | | |
|---|---|---|
| 2,204,520 | Walker et al. | June 11, 1940 |
| 2,430,479 | Pratt et al. | Nov. 11, 1947 |
| 2,649,439 | Brown | Aug. 18, 1953 |
| 2,741,566 | Demme | Apr. 10, 1956 |
| 2,754,280 | Brown et al. | July 10, 1956 |
| 2,763,577 | Lawler | Sept. 18, 1956 |